United States Patent Office 3,470,249
Patented Sept. 30, 1969

3,470,249
1 - (m - HYDROXYPHENYL) - 2 - DIALKYLAMINO METHYL - CYCLOALKENES AND THE SALTS THEREOF AND THE PROCESS OF PERPARING THE SAME
Ernst Frankus, Schleckheim, and Kurt Flick, Bochum-Stiepel, Germany, assignors to Chemie Grunenthal GmbH, Stolberg, Rhineland, Germany
No Drawing. Filed July 6, 1966, Ser. No. 563,044
Claims priority, application Germany, Aug. 2, 1965, C 36,556
Int. Cl. C07c 91/30, 89/00; A61k 25/00
U.S. Cl. 260—570.5
25 Claims

ABSTRACT OF THE DISCLOSURE 1-(m-hydroxy phenyl)-2-methyl alkylamino methyl cyclopentene, cyclohexene, or cycloheptene-(1) compounds have proved to be highly effective antitussive agents. Said compounds are prepared, for instance, by reacting corresponding 1-phenyl-2-methyl alkylamino methyl cycloalkanol-(1) compounds having an etherified hydroxyl group in m-position in the phenyl ring, with a mixture of hydrobromic acid and glacial acetic acid whereby simultaneously dehydration, hydrolysis of the ether group to the phenolic hydroxyl group, and isomerization of the initially formed dehydration product to the active 1,2-unsaturated cycloalkene compound takes place. It is also possible to produce such compounds by isomerization of the corresponding 1-(m-hydroxy phenyl)-2-methyl alkylamino methyl cyclopentene-(5), cyclohexene-(6), or cycloheptene-(7) compounds by means of hydrobromic acid.

---

The present invention relates to new and valuable cycloalkene compounds and more particularly to cycloalkene compounds of the following Formula I

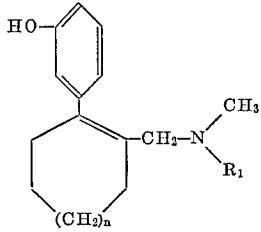

I wherein $R_1$ indicates alkyl containing 1 to 4 carbon atoms and $n$ represents the numerals 0, 1, or 2 and to acid addition salts of said compounds as well as to a process for the manufacture of said compounds.

In Chemical Abstracts, vol. 41, page 6253i (1947) there is described the dehydration of 1-hydroxy-1-(p-methoxy phneyl)-2-(dimethylamino methyl) cyclohexane by means of potassium bisulfate. The resulting dehydration product is designated as 1-(p-methoxy phenyl)-2-(dimethylamino methyl)-1-cyclohexene. It has been found, however, that this compound does not have the structure as assumed, but that it is in fact 1-(p-methoxy phenyl)-2-(dimethylamino methyl)-6-cyclohexene. Administering said compound in a dosage up to 2.5 mg. per kg. of cat body weight does not produce any antitussive effect.

It is one object of the present invention to provide new and valuable cycloalkene compounds which have a surprisingly high antitussive activity and which are well tolerated.

Another object of the present invention is to provide a simple and effective process of making such new and valuable cycloalkene compounds.

A further object of the present invention is to provide valuable antitussive pharmaceutical compositions which can be used in therapy.

Still another object of the present invention is to provide a method of treating coughs and inhibiting or suppressing coughing.

Other objects of the present invention and advantageous features thereof will become apparent as the description proceeds.

According to the present invention compounds of Formula I, and especially those in which $R_1$ indicates a straight chain alkyl, exhibit strong antitussive activity and are generally well tolerated. This is quite surprising since, as stated above, the known 1-(p-methoxy phenyl)-2-(dimethylamino methyl)-6-cyclohexene does not show any such activity at all. For instance, the hydrobromide of 1-(m-hydroxy phenyl)-2-(dimethylamino methyl) cyclohexene(1) when administered intravenously to cats in an amount of 1 mg./kg., causes marked inhibition of the mechanically provoked cough reflex in the narcotized cat. A long lasting complete inhibition of this cough reflex is also cause by administration of 1 mg./kg. of the hydrobromide of 1-(m-hydroxy phenyl)-2-(dimethylamino methyl) cycloheptene(1), when administered intravenously to cats.

In addition to said high antitussive activity the compounds of Formula I possess excellent analgesic, antiphlogistic, and antiproliferative activities.

The new compounds of Formula I are obtained by reacting a compound of Formula II

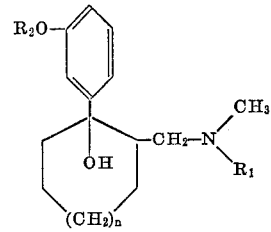

II wherein $R_2$ indicates lower alkyl, aryl or aralkyl and $R_1$ and $n$ have the same meaning as indicated above, with a mixture of hydrobromic acid and glacial acetic acid. During this reaction, which may be carried out at elevated temperature, the starting phenol ether is split up whereby probably the intermediate compound of Formula III is obtained

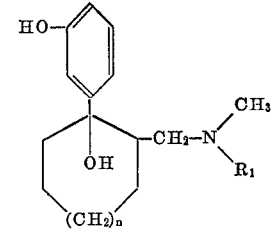

III wherein $R_1$ and $n$ have the same meaning as indicated above. Said intermediate compound is then dehydrated to the corresponding acid addition salt of a compound of Formula I.

The intermediate compounds of Formula III may also be obtained by splitting up the ether group in a compound of Formula II, wherein $R_2$, for instance, indicates aralkyl, preferably benzyl, by hydrogenolysis.

The resulting intermediate compounds of Formula III are especially useful in the preparation of compounds of Formula I. In this preferred embodiment of the process according to the present invention a compound of Formula III is reacted with dehydrating agents, preferably with formic acid, glacial acetic acid, phosphoric acid, sulfuric acid, or with acid metal salts of said polybasic acids, if required at elevated temperature, and the resulting compound of Formula IV

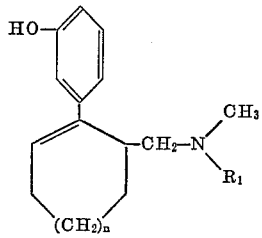

wherein $R_1$ and $n$ have the same meaning as indicated above, is isomerized to a compound of Formula I by the action of aqueous or gaseous hydrogen bromide or by mixtures of hydrobromic acid with suitable acids or solvents, if required, at elevated temperature. The reaction may also be carried out without isolation of the different intermediate compounds.

Using the above mentioned processes for the manufacture of the compounds of Formula I, the salts with hydrobromic acid are obtained. These salts may be used in therapy, if required, after purification. Other acid addition salts of the compounds of Formula I may be prepared by first producing the free bases of Formula I followed by neutralization with the respective acids. Likewise, other acid addition salts of compounds of Formula I are obtained by reacting the hydrobromic acid salts of said compounds with a silver salt, for instance, by reacting the hydrobromide of a compound of Formula I with silver acetate, thereby obtaining the acetic acid salt of the compound of Formula I.

The following examples serve to illustrate the present invention without, however, limiting the same thereto. All temperature data are uncorrected. In carrying out the examples, maximum yields were not intended to be obtained.

Example 1

100 g. of 1-(m-methoxy phenyl) - 2 - (dimethylamino methyl) cyclohexanol-(1) are dissolved in a mixture of 400 ml. of glacial acetic acid and 200 ml. of concentrated aqueous hydrobromic acid and the solution is refluxed for 8 hours. The solvent is distilled off under reduced pressure and the residue is dissolved in a mixture of 120 ml. of ethanol and 60 ml. of acetone. On adding ether, 57 g. of the hydrobromide of 1-(m-hydroxy phenyl)-2-(dimethylamino methyl) cyclohexene(1) are obtained, M.P. 170–172° C.

Example 2

15 g. of the hydrochloride of 1-(m-hydroxy phenyl)-2-(dimethylamino methyl)cyclopentanol-(1) are dissolved in 120 ml. of formic acid and the solution is refluxed for 2 hours. The solvent is distilled off under reduced pressure. The residue is dissolved in a mixture of 50 ml. of ethanol and 25 ml. of acetone. On adding ether, the hydrochloride of 1-(m-hydroxy phenyl)-2-(dimethylamino methyl) cyclopentene-(5) is obtained. 5 g. of said compound are dissolved in a mixture of 50 ml. of glacial acetic acid and 25 ml. of concentrated aqueous hydrobromic acid and the solution is refluxed for 2 hours. The solvent is distilled off. The residue is dissolved in a mixture of ethanol and acetone (2:1). On adding ether, 4.5 g. of the hydrobromide of 1-(m-hydroxy phenyl)-2-(dimethylamino methyl) cyclopentene(1) are obtained, M.P. 156–160° C.

Example 3

5 g. of the hydrochloride of 1-(m-hydroxy phenyl)-2-(dimethylamino methyl) cyclohexanol(1) are dissolved in 50 ml. of formic acid and refluxed for 2 hours. The solvent is distilled off under reduced pressure. The residue is dissolved in a mixture of 25 ml. of a mixture of ethanol and acetone (2:1). On adding ether, the hydrochloride of 1-(m-hydroxy phenyl)-2-(dimethylamino methyl) cyclohexene-(6) is obtained, M.P. 183–184° C. 2 g. of said compound are dissolved in a mixture of 50 ml. of glacial acetic acid and 25 ml. of concentrated aqueous hydrobromic acid and the solution is refluxed for 2 hours. The solvent is distilled off. The residue is dissolved in a mixture of ethanol and acetone. On adding ether, 1.7 g. of the hydrobromide of 1-(m-hydroxy phenyl)-2-(dimethylamino methyl) cyclohexene(1) are obtained, M.P. 170–172° C. The compound is identical with that of Example 1.

Example 4

43 g. of the hydrochloride of 1-(m-hydroxy phenyl)-2-(dimethylamino methyl) cycloheptanol-(1) are dissolved in 200 ml. of formic acid and the solution is refluxed for 2 hours. The solvent is distilled off under reduced pressure. The residue is dissolved in a mixture of 50 ml. of ethanol and 25 ml. of acetone. On adding ether, the hydrochloride of 1-(m-hydroxy phenyl)-2-(dimethylamino methyl) cycloheptene-(7) is obtained, M.P. 193–197° C. 15 g. of said compound are dissolved in a mixture of 50 ml. of glacial acetic acid and 25 ml. of concentrated aqueous hydrobromic acid and the solution is refluxed for 3 hours. The solvent is distilled off under reduced pressure. The residue is dissolved in 60 ml. of a mixture of ethanol and acetone (2:1). On adding ether, 17 g. of the hydrobromide of 1-(m-hydroxy phenyl)-2-(dimethylamino methyl) cycloheptene(1) are obtained, M.P. 158–160° C.

Example 5

11 g. of the hydrochloride of 1-(m-hydroxy phenyl)-2-(methyl-n-propylamino methyl) cyclohexanol-(1) are dissolved in 150 ml. of formic acid and the solution is refluxed for 2 hours. The solvent is distilled off under reduced pressure. The residue is dissolved in a mixture of 50 ml. of ethanol and 25 ml. of acetone. On adding ether, the hydrochloride of 1-(m-hydroxy phenyl)-2-(methyl-n-propylamino methyl) cyclohexene-(6) is obtained, M.P. 133–135° C. 3 g. of said compound are dissolved in a mixture of 40 ml. of glacial acetic acid and 20 ml. of concentrated aqueous hydrobromic acid and the solution is refluxed for 3 hours. The solvent is distilled off under reduced pressure. The residue is dissolved in 30 ml. of a mixture of ethanol and acetone (2:1). On adding ether, 1.8 g. of the hydrobromide of 1-(m-hydroxy phenyl)-2-(methyl-n-propylamino methyl) cyclohexene (1) are obtained, M.P. 122–126° C.

Example 6

14.3 g. of the hydrochloride of 1-(m-hydroxy phenyl)-2-(methyl ethylamino methyl) cycloheptanol-(1) are dissolved in 170 ml. of formic acid and the solution is refluxed for 2 hours. The solvent is distilled off under reduced pressure. The residue is dissolved in a mixture of 80 ml. of glacial acetic acid and 40 ml. of concentrated aqueous hydrobromic acid and the solution is refluxed for 3 hours. The solvent is distilled off under reduced pressure. The residue is dissolved in a mixture of ethanol and acetone (2:1). On adding ether, the hydrobromide of 1-(m-hydroxy phenyl)-2-(methyl ethylamino methyl) cycloheptene(1) is obtained, M.P. 119–121° C.

The cycloalkanols used as starting materials in Examples 2 to 6, are obtained as follows:

Example 7

(a) 11.0 g. of magnesium turnings are treated, while stirring with a solution of 87.5 g. of m-bromo phenyl benzyl ether in 250 ml. of absolute tetrahydrofuran at such a rate that the reaction mixture boils gently because of the heat produced by the reaction which starts immediately. Thereafter, the reaction mixture is boiled under reflux, while stirring, until all the magnesium is dissolved. The reaction mixture is cooled to 0° C. to −10°

C. and a mixture of 47 g. of 2-dimethylamino methyl cyclopentanone and 100 ml. of absolute tetrahydrofuran is added dropwise thereto. The resulting mixture is stirred at room temperature for 4 hours and then poured into a saturated aqueous solution of ammonium chloride. The resulting layers are separated from each other and the aqueous layer is extracted twice with 50 ml. portions of ether. The organic layers are combined, dried with sodium sulfate and evaporated. The residue is distilled whereby 1-(m-benzyloxy phenyl)-2-(dimethylamino methyl) cyclopentanol-(1), boiling at 189–195° C./0.009 mm. Hg, is obtained. 30 g. of said compound are dissolved in 200 ml. of absolute ethanol. After adding palladium precipitated on charcoal, the compound is hydrogenated at atmospheric pressure. The catalyst is filtered off. On adding a solution of hydrogen chloride in ether to the filtrate, the hydrochloride of 1-(m-hydroxy phenyl)-2-dimethylamino methyl) cyclopentanol-(1) is obtained, M.P. 198–201° C.

By reacting m-enzyloxy phenyl magnesium bromide with the respective basic ketone and by hydrogenolysis of the intermediate compound in the same manner as described hereinabove, the following compounds are obtained:

(b) 1-(m-benzyloxy phenyl)-2-(dimethylamino methyl) cyclohexanol-1), boiling at 156–160° C./0.003 mm. Hg. Hydrochloride of 1-(m-hydroxy phenyl)-2-(dimethylamino methyl) cyclohexanol-(1), melting point: 208–210° C.

(c) 1-(m-benzyloxy phenyl)-2-dimethylamino methyl) cycloheptanol-(1), boiling at 195° C./0.005 mm. Hg. Hydrochloride of 1-(m-hydroxy phenyl)-2-(dimethylamino methyl) cycloheptanol-(1), M.P. 204-205° C.

(d) 1-(m-benzyloxy phenyl)-2-(methyl-n-propylamino methyl) cyclohexanol-(1), boiling at 205–215° C./0.01 mm. Hg. Hydrochloride of 1-(m-hydroxy phenyl)-2-(methyl-n-propylamino methyl) cyclohexanol-(1), M.P. 182–184° C.

(e) 1-(m-benzyloxy phenyl) - 2 - (methyl ethylamino methyl) cycloheptanol-(1), boiling at 195° C./0.0001 mm. Hg. Hydrochloride of 1 - (m - hydroxy phenyl)-2-(methyl-ethylamino methyl) cycloheptanol - (1), M.P. 175–176° C.

Example 8

2 g. of the hydrobromide of 1-(m-hydroxy phenyl)-2-(dimethylamino methyl)cyclohexene(1) are dissolved in 25 ml. of water and an excess of an aqueous 10% solution of sodium hydrogen carbonate is added thereto. The mixture is extracted three times with ether, the combined extracts are dried over sodium sulfate, and the solvent is distilled off under reduced pressure. The residue is dissolved in toluene. On adding petroleum ether, 1-(m-hydroxy phenyl)-2-(dimethylamino methyl) cyclohexene (1) is obtained in the form of white crystals, M.P. 101–103° C.

Example 9

1 g. of 1-(m-hydroxy phenyl)-2-(dimethylamino methyl) cyclohexene(1) is dissolved in a mixture of 10 ml. of a mixture of ethanol and acetone (2:1). On adding a solution of hydrogen chloride in ether thereto, the hydrochloride of 1-(m-hydroxy phenyl)-2-(dimethylamino methyl) cyclohexene(1) is obtained, M.P. 176–178° C.

In place of the basically substituted cycloalkanols used in the preceding examples, there may be employed other basically substituted cycloalkanols such as 1-(m-hydroxy phenyl)-2-(methyl-n-butylamino methyl) cyclopentanol-(1), cyclohexanol-(1), or cycloheptanol-(1), 1-(m-hydroxy phenyl)-2-(methyl-n-propylamino methyl) cyclopentanol-(1) or cycloheptanol-(1), or 1-(m-hydroxy phenyl)-2-(methyl ethylamino methyl) cyclopentanol-(1) or cycloheptanol-(1), while otherwise the procedure is the same as described in the preceding examples.

Other acid addition salts than the hydrobromides and hydrochlorides described in the preceding examples such as the acid addition salts with other pharmaceutically acceptable inorganic acids, for instance, with sulfuric acid, nitric acid, phosphoric acid, sulfamic acid, or with substantially non-toxic, pharmaceutically acceptable organic acids, for instance, with acetic acid, propionic acid, maleic acid, succinic acid, gluconic acid, malic acid, citric acid, tartaric acid, benzoic acid, salicylic acid, acetyl salicylic acid, phthalic acid, nicotinic acid, isonicotinic acid, furan-2-carboxylic acid, and others may be prepared according to the methods described hereinbefore or by other suitable methods.

The new basically substituted cycloalkene-(1) compounds of Formula I and their pharmaceutically acceptable acid addition salts can be administered orally, parenterally or rectally. Compositions containing said active compounds as used in therapy comprise, for instance, tablets, pills, dragees, lozenges, and the like shaped preparations to be administered orally. The active compounds may also be administered in powder form, preferably enclosed in gelatin or the like capsules. Oral administration in liquid form, such as in the form of solutions, emulsions, suspensions, sirups, and the like is also possible. Such solid and liquid preparations are produced in a manner known to the art of compounding and processing pharmaceutical products whereby the conventional diluting, binding, and/or expanding agents, lubricants, and/or other excipients, such as lactose, cane sugar, dextrins, starch, talc, kaolin, magnesium hydroxide, magnesium carbonate, pectin, gelatin, agar, bentonite, stearic acid, magnesium stearate, and others may be employed.

The following examples serve to illustrate the preparation of pharmaceutical compositions as they are used in therapy, without, however, limiting the same thereto.

Example 10

Tablets.—20 g. of the hydrobromide of 1-(m-hydroxy phenyl)-2-(dimethylamino methyl) cyclohexene(1), 50.56 g. of microcrystalline cellulose, 75.84 g. of spray-dried lactose, 12 g. of dried corn starch, and 1.6 g. of magnesium stearate are intimately mixed with each other and are compressed, without preceding granulation, to tablets of 7 mm. diameter and a weight of 160 mg. Each tablet contains 20 mg. of the active compound.

Example 11

Dragees.—The mixture of ingredients described in Example 10 is compressed to biconvex dragee cores of 160 mg. each. These cores are sugar-coated by rotating in a coating pan with sugar sirup. Each dragee contains 20 mg. of the hydrobromide of 1-(m-hydroxy phenyl)-2-(dimethylamino methyl) cyclohexene(1).

Example 12

Capsules.—20 g. of the hydrobromide of 1-(m-hydroxy phenyl)-2-(di-methylamino methyl)cycloheptene (1), 161.2 g. of anhydrous dibasic calcium phosphate (U.S. Ph.), 6.6 g. of paraffinum perliquidum (3rd supplement to D.A.B. 6), and 2.2 g. of magnesium stearate are intimately mixed and the mixture is sieved. Portions of 190 mg. each of said mixture are filled in gelatin capsules. Each capsule contains 20 mg. of the active compound.

Example 13

Suppositories.—117 g. of a suppository base (corresponding to *Adeps solidus*, 3rd supplement to D.A.B. 6) and 2 g. of the hydrobromide of 1-(m-hydroxy phenyl)-2-(dimethylamino methyl) cyclohexene(1) are thoroughly triturated while warming the suppository base. The mixture is cast into suppository molds, each of which contains 1.19 g. of the mixture, and is cooled to cause solidification. Each suppository contains 20 mg. of the active compound.

Example 14

Sirup.—0.4 g. of the hydrobromide of 1-(m-hydroxy phenyl)-2-(dimethylamino methyl) cyclohexene(1), 0.5 g. of sodium carboxy methyl cellulose, 0.20 g. of the potassium salt of sorbic acid, 0.3 g. of the sodium salt of cyclohexane sulfamic acid, 1.03 g. of saccharin sodium, 20 g. of sugar, 1.4 g. of Tinctura Aurantii dulcis, 0.7 g. of polysorbate 80, and 0.01 g. of a certified color are intimately mixed with each other, dissolved in distilled water, and made up to a volume of 100 cc. 5 cc. of the resulting sirup contains 20 mg. of the active compound.

Example 15

Pharmaceutical drops.—2 g. of the hydrobromide of 1-(m-hydroxy phenyl)-2-(methyl ethylamino methyl) cycloheptene(1) are intimately mixed with 0.1 g. of saccharin sodium, 3.5 g. of the sodium salt of cyclohexane sulfamic acid. 0.1 g. of sorbic acid, 30.0 g. of 96% ethanol, 0.3 g. of polysorbate 80, and 0.3 g. of peppermint spirit. The mixture is dissolved in distilled water and made up to a volume of 100 cc. One cc. of said solution contains 20 mg. of the active compound.

Example 16

Injectable solution.—0.5 g. of the hydrobromide of 1-(m-hydroxy phenyl)-2-(dimethylamino methyl) cyclohexene(1) and 2.0 g. of sodium citrate are dissolved in 200 cc. of water. Each cc. of the resulting solution contains 2.5 mg. of the active compound. The solution is filtered to free it of fibers and is filled into ampoules which are then sterilized by heating to 120° C. The solution is administered by intramuscular injection.

Compositions as described in the preceding examples have been administered to patients suffering from bronchial asthma which in some of them was of chronic nature. Administration of 20 mg. of the hydrobromide of 1-(m-hydroxy phenyl)-2-(dimethylamino methyl) cyclohexene(1), for instance, suppressed the cough reflex completely within a short period of time regardless whether administered in the form of tablets, capsules, dragees, or drops.

Patients suffering from pneumonia, some of them from chronic pneumonia, received 20 mg. of the hydrochloride of 1-(m-hydroxy phenyl)-2-dimethylamino methyl) cyclohexene(1) to suppress nocturnal coughing. Rapid onset of relief was observed.

Complete and prolonged suppression of coughing was achieved by administering 20 mg. of the hydrobromide of 1-(m-hydroxy phenyl)-2-(dimethylamino methyl) cyclohexene(1) to a patient with a plasmocytoma.

Carcinoma patients, especially patients suffering from bronchial carcinoma could be relieved from coughing by administration of 20 mg. of the hydrobromide of 1-(m-hydroxy phenyl)-2-(dimethylamino methyl)cyclohexene(1).

A patient suffering from lung congestion accompanied by cardiac insufficiency received 20 mg. of the hydrobromide of 1-(m-hydroxy phenyl)-2-(dimethylamino methyl) cyclohexene(1) to suppress nocturnal coughing. Rapid onset of the cough suppressing effect was observed.

Of course, many changes and variations in the starting materials, the reactants, dehydrating and isomerizing agents, the solvents used, the reaction conditions, temperature, and duration, the acids used for forming the acid addition salts, the method of isolating and purifying the antitussive agents of the present invention and their pharmaceutically acceptable acid addition salts, the pharmaceutical compositions containing said antitussive agents and their salts, the mode of administration, and the like may be made by those skilled in the art in accordance with the principles set forth herein.

We claim:

1. A cycloalkene(1) compound selected from the group consisting of a cycloalkene(1) compound of the formula

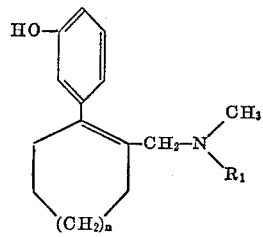

wherein $R_1$ indicates alkyl having 1 to 4 carbon atoms and $n$ represents the numerals 0, 1, and 2, and pharmaceutically acceptable acid addition salts of said cycloalkene(1) compound.

2. The cycloalkene(1) compound according to claim 1, wherein the cycloalkene ring is a cyclopentene ring and $n$ is 0.

3. The cycloalkene(1) compound according to claim 1, wherein the cycloalkene ring is a cyclohexene ring and $n$ is 1.

4. The cycloalkene(1) compound according to claim 1, wherein the cycloalkene ring is a cycloheptene ring and $n$ is 2.

5. The cycloalkene(1) compound according to claim 1, wherein $R_1$ is methyl and $n$ is 0, said compound being 1-(m-hydroxy phenyl)-2-(dimethylamino methyl) cyclopentene-(1).

6. The cycloalkene(1) compound according to claim 1, wherein $R_1$ is methyl and $n$ is 1, said compound being 1-(m-hydroxy phenyl)-2-(dimethylamino methyl) cyclohexene (1).

7. The cycloalkene(1) compound according to claim 1, wherein $R_1$ is methyl and $n$ is 2, said compound being 1-(m-hydroxy phenyl)-2-(dimethylamino methyl) cycloheptene(1).

8. The cycloalkene(1) compound according to claim 1, wherein $R_1$ is n-propyl and $n$ is 1, said compound being 1-(m-hydroxy phenyl)-2-(methyl-n-propylamino methyl) cyclohexene(1).

9. The cycloalkene(1) compound according to claim 1, wherein $R_1$ is ethyl and $n$ is 2, said compound being 1-(m-hydroxy phenyl)-2-(methylethylamino methyl) cycloheptene(1).

10. The hydrobromide of the compound according to claim 5.

11. The hydrobromide of the compound according to claim 6.

12. The hydrochloride of the compound according to claim 6.

13. The hydrobromide of the compound according to claim 7.

14. The hydrobromide of the compound according to claim 8.

15. The hydrobromide of the compound according to claim 9.

16. In a process of producing cycloalkene(1) compounds containing basic groups of the formula

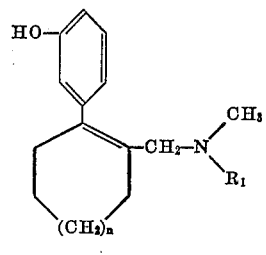

wherein $R_1$ indicates alkyl having 1 to 4 carbon atoms and $n$ represents the numerals 0, 1 and 2, and their pharmaceutically acceptable acid addition salts, the step comprising reacting a compound of the formula

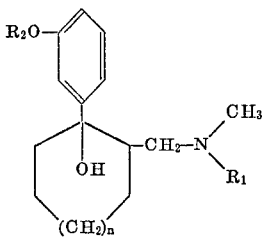

R₂ indicates a member selected from the group consisting of lower alkyl, aryl, and aralkyl and
R₁ and n represent the same members and numerals as indicated above,
with a mixture of hydrobromic acid and glacial acetic acid.

17. In a process of producing cycloalkene(1) compounds containing basic groups of the formula

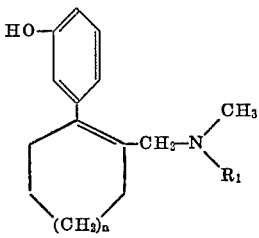

wherein
R₁ indicates alkyl having 1 to 4 carbon atoms and
n represents the numerals 0, 1, and 2,
and their pharmaceutically acceptable acid addition salts, the steps comprising reacting a compound of the formula

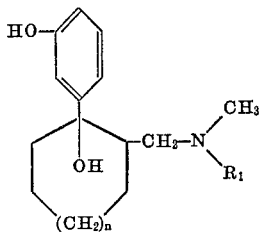

wherein
R₁ and n represent the same members and numerals as indicated above,
with a dehydrating agent selected from the group consisting of formic acid, glacial acetic acid, phosphoric acid, sulfuric acid, the acid metal salts of phosphoric acid, and the acid metal salts of sulfuric acid and subjecting the resulting compound of the formula

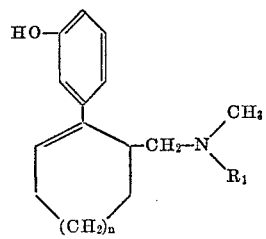

wherein
R₁ and n represent the same members and numerals as indicated above,
to the action of hydrogen bromide to isomerize said compound.

18. The process according to claim 17, wherein dehydration is carried out at elevated temperature.

19. The process according to claim 17, wherein isomerization is effected by the action of gaseous hydrogen bromide.

20. The process according to claim 17, wherein isomerization is effected by the action of aqueous hydrogen bromide.

21. The process according to claim 17, wherein isomerization is effected by the action of a mixture of hydrogen bromide and glacial acetic acid.

22. In a process of producing cycloalkene(1) compounds containing basic groups of the formula

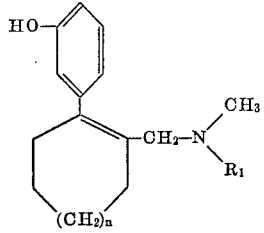

wherein
R₁ indicates alkyl having 1 to 4 carbon atoms and
n represents the numerals 0, 1, and 2,
and their pharmaceutically acceptable acid addition salts, the step which comprises subjecting a compound of the formula

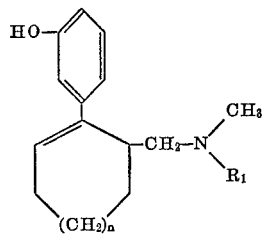

wherein
R₁ and n represent the same members and numerals as indicated above,
to the action of hydrogen bromide to isomerize said compound.

23. The process according to claim 22, wherein isomerization is effected by the action of gaseous hydrogen bromide.

24. The process according to claim 22, wherein isomerization is effected by the action of aqueous hydrogen bromide.

25. The process according to claim 22, wherein isomerization is effected by the action of a mixture of hydrogen bromide and glacial acetic acid.

References Cited

UNITED STATES PATENTS

| | | | |
|---|---|---|---|
| 3,062,884 | 11/1962 | Green | 260—570.8 |
| 3,072,716 | 1/1963 | Huebner | 260—570.8 X |

OTHER REFERENCES

Barrett et al., "Jour. Chem. Soc. London," 1958, pages 340–8.

Lee et al., "Chemical Abstracts," vol. 41, pages 6246–54 (1947).

Royals, "Advanced Organic Chemistry," pages 312–3 (1954).

Wagner et al., "Synthetic Organic Chemistry," pages 32–35 (1953).

ROBERT V. HINES, Primary Examiner

U.S. Cl. X.R.

260—295.5, 347.7, 501.17, 612; 424—266, 285, 330